(12) United States Patent
Chiang et al.

(10) Patent No.: US 9,538,094 B2
(45) Date of Patent: Jan. 3, 2017

(54) IP CAMERA WITH IR CUT BURNOUT AND DISLOCATION AVOIDANCE MECHANISM

(71) Applicant: Sercomm Corporation, Taipei (TW)

(72) Inventors: Meng-Chien Chiang, Taipei (TW); Chien-Ming Chen, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 0 days.

(21) Appl. No.: 14/642,880

(22) Filed: Mar. 10, 2015

(65) Prior Publication Data

US 2015/0304536 A1 Oct. 22, 2015

(30) Foreign Application Priority Data

Apr. 16, 2014 (CN) .......................... 2014 1 0152680

(51) Int. Cl.
*H04N 5/238* (2006.01)
*H04N 5/232* (2006.01)

(52) U.S. Cl.
CPC .......... *H04N 5/238* (2013.01); *H04N 5/23241* (2013.01)

(58) Field of Classification Search
CPC . H04N 5/238; H04N 5/23203; H04N 5/23241
USPC ........................................................ 348/342
See application file for complete search history.

(56) References Cited

U.S. PATENT DOCUMENTS

| 5,982,423 A | * | 11/1999 | Sekiguchi | ............ | H04N 5/2254 250/330 |
| 7,885,535 B2 | * | 2/2011 | Horowitz | .............. | G01J 1/4228 396/221 |
| 8,179,064 B2 | | 5/2012 | Li | | |
| 2006/0244583 A1 | * | 11/2006 | Kawada | ................. | H04N 5/238 340/468 |
| 2007/0189759 A1 | * | 8/2007 | Kobayashi | ........... | H04N 5/2254 396/275 |

FOREIGN PATENT DOCUMENTS

| CN | 101902032 A | 12/2010 |
| CN | 201698138 U | 1/2011 |
| CN | 102253571 A | 11/2011 |

OTHER PUBLICATIONS

SIPO Office Action dated Aug. 24, 2016 in Chinese application (No. 201410152680.9).

\* cited by examiner

*Primary Examiner* — Nhan T. Tran
*Assistant Examiner* — Chan Nguyen
(74) *Attorney, Agent, or Firm* — McClure, Qualey & Rodack, LLP

(57) ABSTRACT

An IP camera is provided. The IP camera includes a camera lens, an imaging unit, an IR cut filter, a motor, and a control circuit. The motor controls the position of the IR cut filter. The control circuit outputs a first pulse signal to drive the motor to move the IR cut filter such that light that passes through the camera lens reaches the imaging unit without passing through the IR cut filter. The control circuit controls the motor and prevents the motor from heat-related damage.

13 Claims, 5 Drawing Sheets

IP CAMERA WITH IR CUT BURNOUT AND DISLOCATION AVOIDANCE MECHANISM

This application claims the benefit of People's Republic of China application Serial No. 201410152680.9, filed Apr. 16, 2014, the subject matter of which is incorporated herein by reference.

BACKGROUND

Field of the Invention

The disclosure relates in general to an IP camera, and more particularly to an IP camera with an IR cut filter.

Related Art

Internet protocol (IP) camera has been widely used in home environment in modern life, especially for the purpose of home security. IP camera is able to send and receive data, such as digital video content, via a network, and hence is easy to use.

It is common that an IP camera remains turned on twenty-four hours a day. During the day, an infrared (IR) cut filter may be used to filter out the IR light so that the IR light does not distort the colors of images. During the night, the light entering the camera does not pass through the IR cut filter in order to capture images at night. However, when moving the IR cut filter, there may be excessive transient power causing malfunction.

SUMMARY

The disclosure is directed to an IP camera.

According to one aspect of the invention, an IP camera is provided. The IP camera includes a camera lens, an imaging unit, an IR cut filter, a motor, and a control circuit. The motor controls the position of the IR cut filter. The control circuit outputs a first pulse signal to drive the motor to move the IR cut filter such that light that passes through the camera lens reaches the imaging unit without passing through the IR cut filter.

The invention will become apparent from the following detailed description of the preferred but non-limiting embodiments. The following description is made with reference to the accompanying drawings.

Figure 1A:
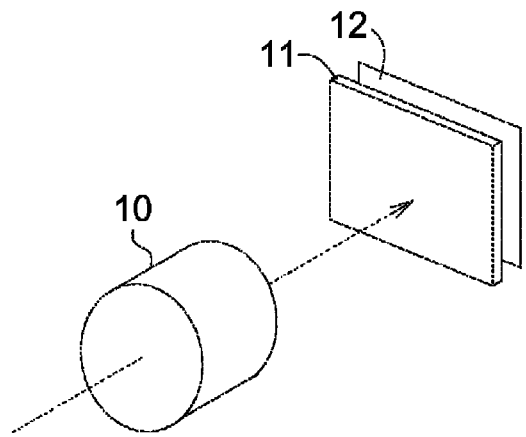
FIG. 1A and FIG. 1B show diagrams of an IP camera with an IR cut filter.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
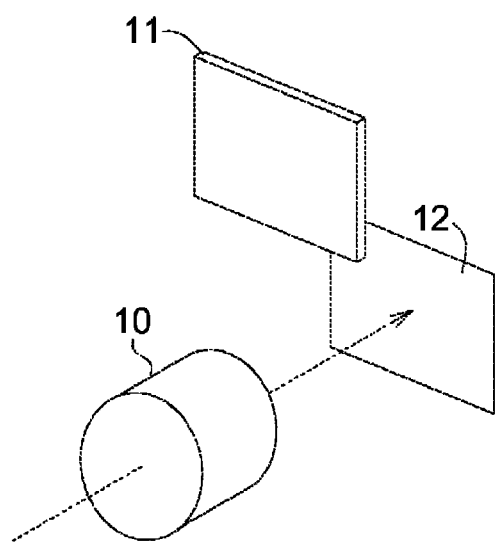

FIG. 1A and FIG. 1B show diagrams of an IP camera with an IR cut filter. As shown in FIG. 1A, IP camera 1 includes a camera lens 10, an IR cut filter 11, and an imaging unit 12. The imaging unit 12 may be for example a charge-coupled device (CCD) or a complementary metal-oxide semiconductor (CMOS). The IR cut filter 11 prevents the infrared light from passing through it, and the IR cut filter 11 may be moved between different positions.

FIG. 1A shows the operating condition when the IP camera 1 is in the day mode. The IR cut filter 11 is positioned between the camera lens 10 and the imaging unit 12, such that light that passes through the camera lens 10 also passes through the IR cut filter 11 to reach the imaging unit 12. Therefore the infrared component of the light is blocked in order to prevent the captured image from being affected by the infrared light, which may cause color distortion.

FIG. 1B shows the operating condition when the IP camera 1 is in the night mode. The IR cut filter 11 is moved away from the front side of the imaging unit 12, and thus light that passes through the camera lens 10 directly reaches the imaging unit 12. The light in environment is insufficient at night, the IP camera 1 may supplement lighting by an infrared light source (not shown in FIG. 1B). Therefore the IR cut filter 11 is moved away from the front side of the imaging unit 12 so that the infrared component may be captured by the imaging unit 12 for a better night image quality.

The position of the IR cut filter 11 may be controlled by a motor. For example, a motor may be driven by a direct current (DC) signal. When the IP camera 1 switches mode, that is, when the IR cut filter 11 changes position, the DC driving signal often causes large current that results in excessive transient power consumption, which is bad for an IP camera operated in a high-temperature environment. Thus there is a need to overcome the large current problem caused by driving a motor with DC signal.

Figure 2:
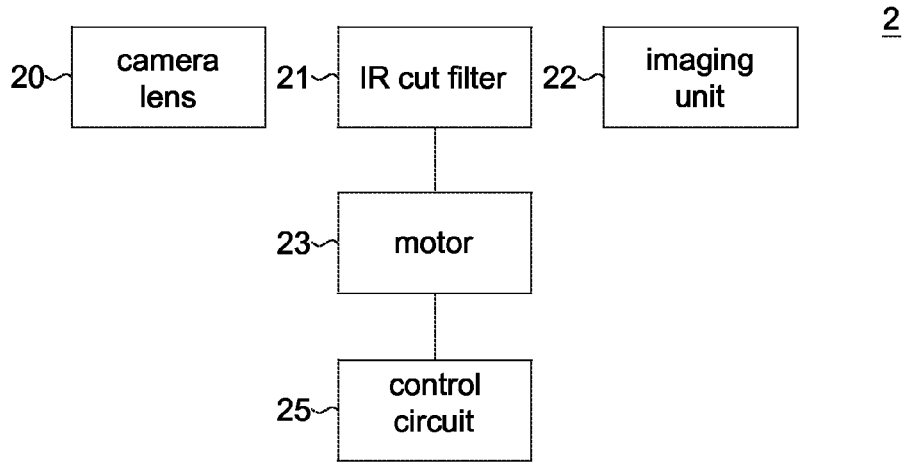
FIG. 2 shows a diagram of an IP camera according to one embodiment of the invention.

FIG. 2 shows a diagram of an IP camera according to one embodiment of the invention. The IP camera 2 includes a camera lens 20, an imaging unit 22, an IR cut filter 21, a motor 23, and a control circuit 25. The motor 23 controls the position of the IR cut filter 21. The control circuit 25 outputs pulse signals to drive the motor 23 in order to move the IR cut filter 21. The detailed description is given below.

The motor 23 controls the position of the IR cut filter 21 to determine whether the IR cut filter 21 is in front of the imaging unit 22 or not. When the IR cut filter 21 is in front of the imaging unit 22, the infrared component of the light may be filtered out. In this embodiment, the motor 23 is driven by a pulse signal generated by the control circuit 25. Because the driving signal generated by the control circuit 25 is a pulse signal, the power consumption may be reduced as compared to a DC driving signal, such as a constant logic high signal. Thus the risk of burning out the motor 23 due to excessive current when switching the position of the IR cut filter 21 can be reduced effectively.

Figure 3A:
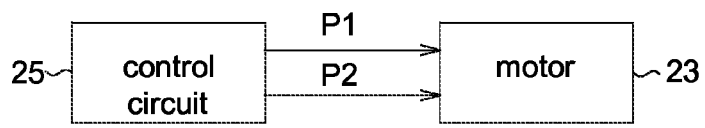
FIG. 3A shows a connection diagram of a control circuit and a motor.
Figure 3B:
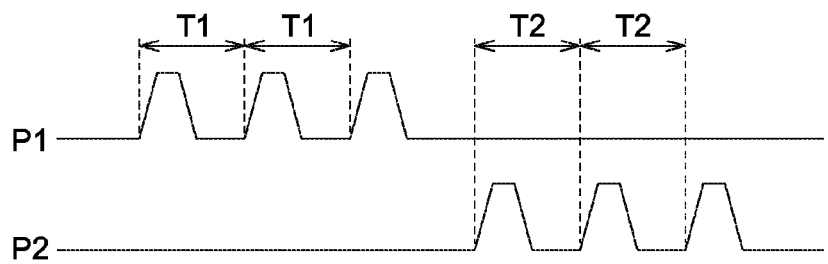
FIG. 3B shows a waveform of the signal outputted from the control circuit.

FIG. 3A shows a connection diagram of a control circuit and a motor. In one possible implementation, the control circuit 25 includes a first output terminal and a second output terminal. A first pulse signal P1 is generated at the first output terminal, and a second pulse signal P2 is generated at the second output terminal. FIG. 3B shows a waveform of the signal outputted from the control circuit. As shown in FIG. 3B, a first time duration during which the first pulse signal P1 is at logic high level does not overlap with a second time duration during which the second pulse signal P2 is at logic high level. The position of the IR cut filter 21 is controlled by the first pulse signal P1 and the second pulse signal P2.

The first pulse signal P1 drives the motor 23 to make the IR cut filter 21 be moved away from the front side of the imaging unit 22 (night mode of the IP camera 2). On the other hand, the second pulse signal P2 drives the motor 23 to make the IR cut filter 21 be positioned in front of the imaging unit 22 (day mode of the IP camera 2).

The control circuit 25 may output the first pulse signal P1 every period T1 in order to ensure that the IR cut filter 21 is located at the correct position. The period T1 may be for example 10 seconds, 1 minute, 10 minutes, or other reasonable time durations, which may be adjusted depending on the user requirement. Because there may be some unexpected errors which may occur during operation, for example, environment factors (such as earthquake), human factors (such as being moved, hit, pushed by a person), or a sudden electric signal transmission failure, the IR cut filter 21 may be located at an incorrect position accidentally. The control circuit 25 may output the first pulse signal P1 every period T1 in the night mode. In this way, even if the IR cut filter 21 deviates from the correct position due to an unexpected error, the IR cut filter 21 can be moved back to the correct position the next time the control circuit 25 outputs the first pulse signal P1. Similarly, the control circuit 25 outputs the second pulse signal P2 every period T2 in the day mode in order to ensure the IR cut filter 21 is located at the correct position. The period T2 may be equal to the period T1. As described above, as compared to driving with a DC signal, using an intermittent pulse signal to drive the motor 23 not only reduces the power consumption but also ensures the IR cut filter 21 is positioned correctly.

Figure 4A:
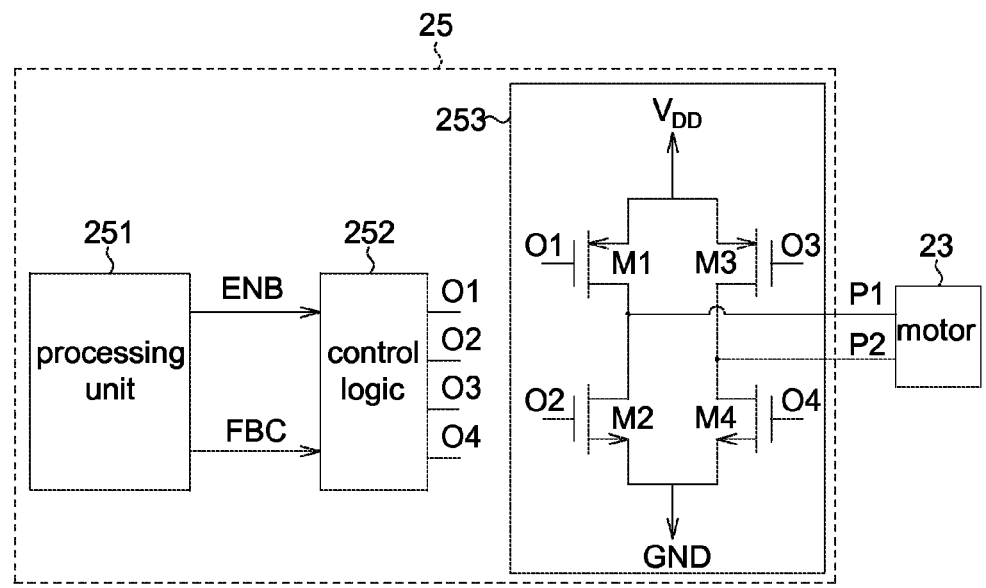
FIG. 4A shows a circuit diagram of the control circuit according to one embodiment of the invention.

FIG. 4A shows a circuit diagram of the control circuit according to one embodiment of the invention. In this embodiment, the control circuit 25 includes a processing unit 251, a control logic 252, and an output stage 253. The processing unit 251 generates an enabling signal ENB and a control signal FBC. The control logic 252 is coupled to the processing unit, and generates control output signals O1-O4 according to the enabling signal ENB and the control signal FBC. The output stage 253 is coupled to the control logic 252. The output stage 253 generates the first pulse signal P1 at a first output terminal and generates the second pulse signal P2 at a second output terminal according to the control output signals O1-O4. The first output terminal and the second output terminal are coupled to the motor 23.

The output stage 253 includes a first transistor M1, a second transistor M2, a third transistor M3, and a fourth transistor M4. The gate terminal of the first transistor M1 is coupled to the first control output signal O1. The gate terminal of the second transistor M2 is coupled to the second control output signal O2. The drain terminal of the second transistor M2 is coupled to the drain terminal of the first transistor M1 and the first output terminal of the control circuit 25. The gate terminal of the third transistor M3 is coupled to the third control output signal O3. The gate terminal of the fourth transistor M4 is coupled to the fourth control output signal O4. The drain terminal of the fourth transistor M4 is coupled to the drain terminal of the third transistor M3 and the second output terminal of the control circuit 25. The source terminal of the first transistor M1 and the source terminal of the third transistor M3 are coupled to the voltage supply $V_{DD}$. The source terminal of the second transistor M2 and the source terminal of the fourth transistor M4 are coupled to the ground GND.

In the above example, the number of control output signals may also be more than four or less than four, depending on the design of the output stage 253. The truth table of the enabling signal ENB, the control signal FBC generated by the processing unit 251 and the first pulse signal P1, the second pulse signal P2 generated by the output stage 253 is shown in Table 1 below.

TABLE 1

| ENB | FBC | P1 | P2 |
|-----|-----|----|----|
| H   | X   | L  | L  |
| L   | H   | H  | L  |
| L   | L   | L  | H  |

In the above table 1, H represents logic high level, L represents logic low level, and X represents don't care term. When the enabling signal ENB is logic high, the first pulse signal P1 and the second pulse signal P2 generated are both logic low. When the enabling signal ENB is logic low, the first pulse signal P1 and the second pulse signal are determined by the control signal FBC.

Figure 4B:
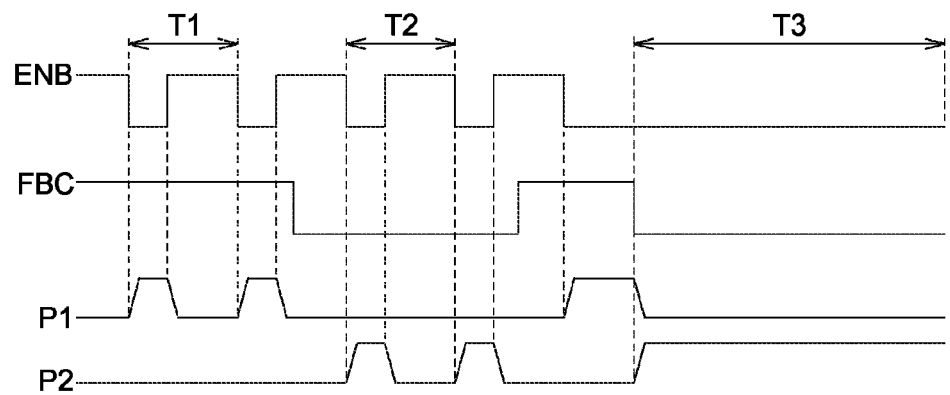
FIG. 4B shows a signal waveform of the control circuit.

FIG. 4B shows a signal waveform of the control circuit. The relationship between signals is in accordance with the truth table shown in table 1. The processing unit 251 adjusts the enabling signal ENB and the control signal FBC appropriately to make the control circuit 25 outputs the first pulse signal P1 every period T1 or outputs the second pulse signal P2 every period T2 (T2 may be equal to T1). The first pulse signal P1 and the second pulse signal P2 will not be logic high at the same time. In order to generate the periodic first pulse signal P1, the processing unit 251 may assert the enabling signal ENB (set the enabling signal ENB to be active, which is logic low level in this embodiment) every period T1 in night mode. Similarly, the processing unit may assert the enabling signal ENB every period T2 in day mode. With the period T2 being equal to the period T1, the signal timing of the processing unit 251 is consistent and thus can be controlled effectively. The processing unit 251 may be for example a processor.

Figure 4C:
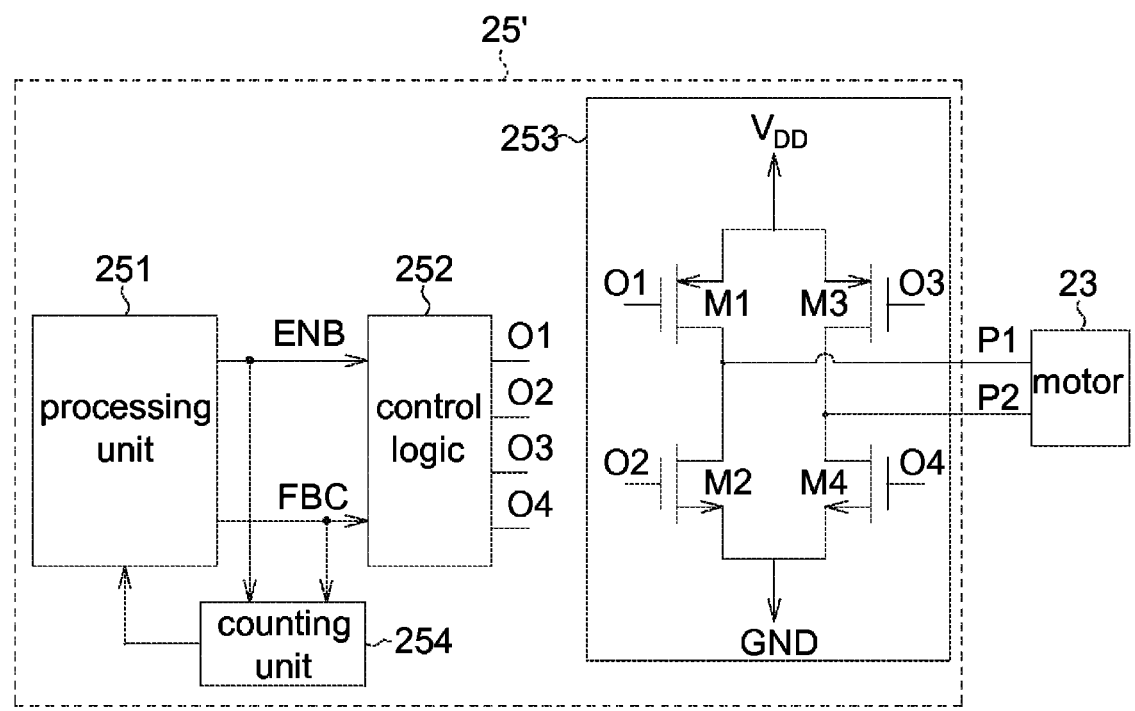
FIG. 4C shows a circuit diagram of the control circuit according to one embodiment of the invention.

FIG. 4C shows a circuit diagram of the control circuit according to one embodiment of the invention. The difference between the control circuit 25' shown in FIG. 4C and the control circuit 25 shown in FIG. 4A is that the control circuit 25' further includes a counting unit 254. The counting unit 254 may be a hardware implemented timer or counter, such as a counter including cascaded flip-flops. The counting unit 254 is coupled to the processing unit 251. The counting unit 254 monitors the status of the enabling signal ENB and the control signal FBC.

Please refer to FIG. 4B. During the period T3, both the enabling signal ENB and the control signal FBC remain unchanged. This situation may arise due to a crash of the processing unit 251. The counting unit 254 starts counting when both of the enabling signal ENB and the control signal FBC stop changing state to determine a time duration that the enabling signal ENB and the control signal FBC remain unchanged. The counting unit 254 also resets the processing unit 251 when the time duration is greater than a threshold value. For example, there may be a state signal S in the counting unit 254 representing the time duration that these two signals remain unchanged. The state signal S may be initialized to 0 when the counting starts. When the state signal S exceeds a pre-determined threshold value T, the counting unit 254 resets the processing unit 251. The magnitude of the threshold value T may be adjusted according to various environment factors, such as device temperature, operating time, circuit characteristics, or may also be setup by users. As the counting unit 254 monitors the enabling signal ENB and the control signal FBC, the time duration that the processing unit 251 crashes can be controlled within a limited amount of time, which prevents the control circuit 25' and/or the motor 23 from heat-related damages.

Figure 5:
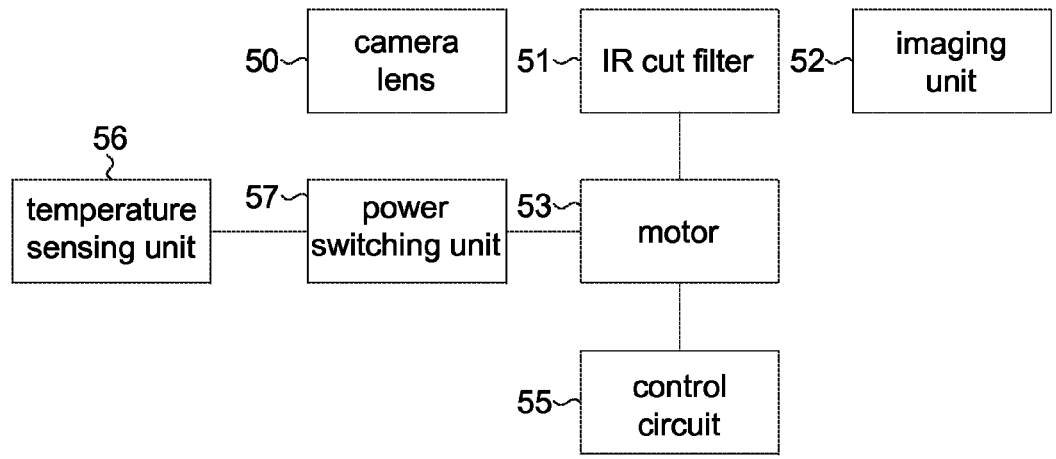
FIG. 5 shows a diagram of an IP camera according to one embodiment of the invention.

FIG. 5 shows a diagram of an IP camera according to one embodiment of the invention. The difference between the IP camera 5 and the IP camera 2 described above is: the IP camera 5 further includes a temperature sensing unit 56 and a power switching unit 57. The temperature sensing unit 56 detects a sensed temperature. The power switching unit 57 is coupled to the temperature sensing unit 56 and controls the power of the motor 53.

The temperature sensing unit 56 may detect the temperature inside the body of the IP camera 5. When the sensed temperature detected by the temperature sensing unit 56 exceeds a threshold temperature, the power switching unit 57 turns off the power of the motor 53. That is, when the IP camera 5 encounters an unusual high temperature, which may be caused by element being short-circuited or other reasons, the power switching unit 57 may force the motor 53 to be turned off, and hence the motor 53 no longer switches the position of the IR cut filter 51.

Once the power switching unit 57 turns off the power of the motor 53, the motor 53 remains in the state of being turned off. Even if the temperature inside the IP camera 5 drops below the threshold temperature, the power switching unit 57 does not turn on the power of the motor 53. Only when the user cuts down the power of the IP camera 5 and restarts the IP camera 5, the power switching unit 57 is reset and the motor 53 again functions properly. Such irreversible characteristic of the power switching unit 57 effectively reminds the user that the IP camera 5 has encountered or currently has an unusual high temperature.

Because the IP camera 5 includes the temperature sensing unit 56, power may be turned off according to the sensed temperature, and hence better safety is provided. Possible short circuit may be discovered as early as possible, and the power is turned off automatically to prevent temperature from getting even higher, which may cause further damage to the device. Moreover, since the motor 53 remains in the off state once the power switching unit 57 turns off the motor 53, even if the temperature inside the camera body is close to the threshold temperature, the fluctuation between on state and off state of the motor 53 can be prevented. The situation that the position of the IR cut filter 51 is switched back and forth repeatedly, which may degrade video quality significantly, can be prevented as well.

Figure 6:
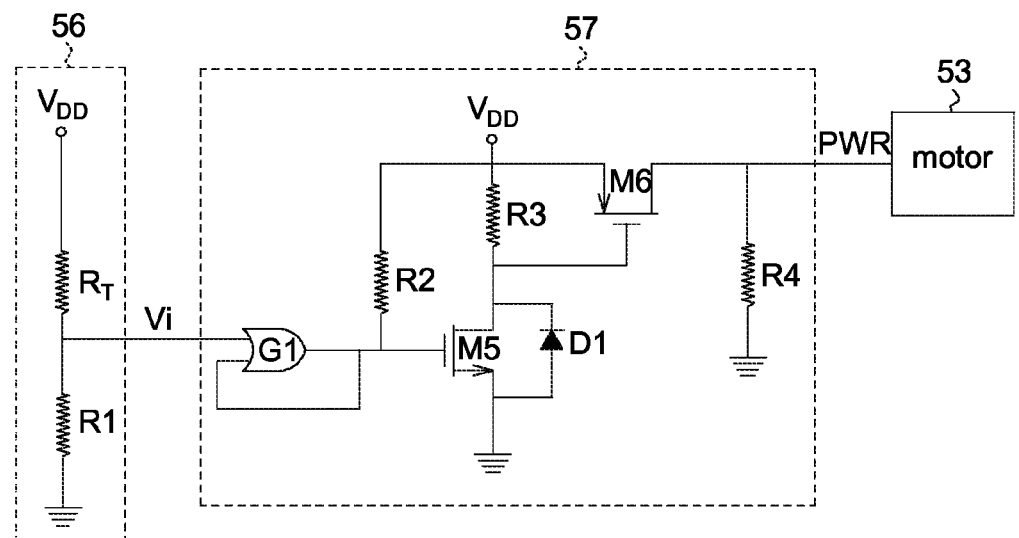
FIG. 6 shows a circuit diagram of the temperature sensing unit and the power switching unit.

FIG. 6 shows a circuit diagram of the temperature sensing unit and the power switching unit. In one implementation, the temperature sensing unit 56 generates an indication voltage Vi according to the sensed temperature. The power switching unit 57 controls the power of the motor 53 according to the indication voltage Vi.

The power switching unit 57 may include an OR gate G1. The first input terminal of the OR gate G1 is coupled to the indication voltage Vi, and the output terminal of the OR gate G1 is fed back into the second input terminal of the OR gate G1. The temperature sensing unit 56 may include a negative temperature coefficient (NTC) thermistor $R_T$ and a first resistor R1. The power switching unit 57 may further include a second resistor R2, a third resistor R3, a fourth resistor R4, a fifth transistor M5, a sixth transistor M6, and a diode D1. The connection relationship between elements is illustrated in FIG. 6.

The higher the sensed temperature, the lower the resistance value of the NTC thermistor $R_T$, and hence the higher the indication voltage Vi will be. When the sensed temperature is higher than the threshold temperature, the indication voltage Vi is high enough to be regarded as a logic high level, which in turn makes the output of the OR gate G1 logic high level. Then the power switching unit 57 turns off the power of the motor 53. Since the output terminal of the OR gate G1 is fed back into its own input terminal, the OR gate G1 remains logic high, and hence the motor 53 remains in the off state until the IP camera 5 is fully restarted.

In summary, the IP camera disclosed herein drives the motor with a pulse signal, therefore the power consumption can be reduced as compared to DC driving current. Furthermore, because the pulse is generated every period, the IR cut filter can be kept in the correct position. Even if the IP camera is physically or electrically disturbed, the IR cut filter can be moved back to the correct position within a short period of time.

In addition, because the IP camera may include a counting unit that monitors the status of the processing unit, even if the processing unit crashes unexpectedly, the counting unit is able to determine the time duration of that crash event and reset the processing unit accordingly. Therefore the control circuit and the motor are prevented from heat-related damages.

The IP camera in this disclosure may further include a temperature sensing unit, which detects the temperature of the IP camera in real time. When the temperature of the IP camera is too high, the power of the motor can be turned off automatically to prevent temperature from getting even higher, which may cause further damage to the device. Moreover, the motor remains in the off state once its power is turned off. Therefore the situation that the position of the IR cut filter is switched back and forth repeatedly can also be prevented.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An IP camera, comprising:
a camera lens;
an imaging unit;
an IR cut filter;
a motor, controlling the position of the IR cut filter; and
a control circuit, outputting a first pulse signal to drive the motor to move the IR cut filter such that light that passes through the camera lens reaches the imaging unit without passing through the IR cut filter, and outputting a second pulse signal to drive the motor to move the IR cut filter to the front side of the imaging unit;
wherein the first pulse signal has one or more pulses, and the second pulse signal has one or more pulses;
wherein the control circuit comprises:
a processing unit, generating an enabling signal and a control signal;

a control logic, coupled to the processing unit, wherein the control logic generates a plurality of control output signals according to the enabling signal and the control signal; and an output stage, coupled to the control logic, wherein the output stage generates the first pulse signal at a first output terminal or generates the second pulse signal at a second output terminal according to the control output signals, wherein the first output terminal and the second output terminal are coupled to the motor.

2. The IP camera according to claim 1, wherein the first pulse signal is a periodic pulse train with a period T1.

3. The IP camera according to claim 1, wherein the first pulse signal is a periodic pulse train with a period T1, the second pulse signal is a periodic pulse train with a period T2, and the period T2 is equal to the period T1.

4. The IP camera according to claim 1, wherein the control output signals comprise a first output signal, a second output signal, a third output signal, and a fourth output signal, the output stage comprises:
 a first transistor, wherein the gate terminal of the first transistor is coupled to the first output signal;
 a second transistor, wherein the gate terminal of the second transistor is coupled to the second output signal, and the drain terminal of the second transistor is coupled to the drain terminal of the first transistor and the first output terminal;
 a third transistor, wherein the gate terminal of the third transistor is coupled to the third output signal; and
 a fourth transistor, wherein the gate terminal of the fourth transistor is coupled to the fourth output signal, and the drain terminal of the fourth transistor is coupled to the drain terminal of the third transistor and the second output terminal.

5. The IP camera according to claim 1, wherein the control circuit further comprises:
 a counting unit, determining a time duration that the enabling signal and the control signal remain unchanged, and resetting the processing unit when the time duration is greater than a threshold value.

6. The IP camera according to claim 1, further comprises:
 a temperature sensing unit, detecting a sensed temperature; and
 a power switching unit, coupled to the temperature sensing unit, wherein the power switching unit controls the power of the motor.

7. The IP camera according to claim 6, wherein when the sensed temperature is higher than a threshold temperature, the power switching unit turns off the power of the motor.

8. The IP camera according to claim 6, wherein the power switching unit no longer turns on the power of the motor after the power switching unit turns off the power of the motor.

9. The IP camera according to claim 6, wherein the temperature sensing unit generates an indication voltage according to the sensed temperature, and the power switching unit controls the power of the motor according to the indication voltage.

10. The IP camera according to claim 9, wherein the power switching unit comprises an OR gate, the first input terminal of the OR gate is coupled to the indication voltage, and the output terminal of the OR gate is fed back into the second input terminal of the OR gate; and
 wherein the indication voltage increases as the sensed temperature increases.

11. The IP camera according to claim 10, wherein the temperature sensing unit comprises a negative temperature coefficient thermistor.

12. The IP camera according to claim 1, wherein the IP camera is a power over Ethernet IP camera.

13. An IP camera, comprising:
 a camera lens;
 an imaging unit;
 an IR cut filter;
 a motor, controlling the position of the IR cut filter;
 a control circuit, outputting a first pulse signal to drive the motor to move the IR cut filter such that light that passes through the camera lens reaches the imaging unit without passing through the IR cut filter;
 a temperature sensing unit, detecting a sensed temperature; and
 a power switching unit, coupled to the temperature sensing unit, wherein the power switching unit controls the power of the motor;
 wherein the temperature sensing unit generates an indication voltage according to the sensed temperature, and the power switching unit controls the power of the motor according to the indication voltage;
 wherein the power switching unit comprises an OR gate, the first input terminal of the OR gate is coupled to the indication voltage, and the output terminal of the OR gate is fed back into the second input terminal of the OR gate; and
 wherein the indication voltage increases as the sensed temperature increases.

* * * * *